(12) United States Patent
Bichler

(10) Patent No.: US 7,237,290 B2
(45) Date of Patent: Jul. 3, 2007

(54) VOLUME-FLEXIBLE BODY FILLABLE WITH A FLUID ELEMENT

(75) Inventor: Thomas Bichler, Penzberg (DE)

(73) Assignee: Hoerbiger Automatisierungstechnik Holding GmbH, Altenstadt (DE)

( * ) Notice: Subject to any disclaimer, the term of this patent is extended or adjusted under 35 U.S.C. 154(b) by 216 days.

(21) Appl. No.: 11/076,043

(22) Filed: Mar. 10, 2005

(65) Prior Publication Data
US 2005/0198740 A1 Sep. 15, 2005

(30) Foreign Application Priority Data
Mar. 10, 2004 (AT) ................. A 420/2004

(51) Int. Cl.
*A47C 27/08* (2006.01)
(52) U.S. Cl. ............... 5/655.3; 5/654; 297/452.41; 297/180.13
(58) Field of Classification Search ............. 5/655.3, 5/706, 710, 713, 644, 654; 297/452.41, 180.11, 297/180.13, 180.14
See application file for complete search history.

(56) References Cited

U.S. PATENT DOCUMENTS 4,965,899 A 10/1990 Sekido et al.
5,806,928 A * 9/1998 Gattuso et al. .......... 297/284.6

FOREIGN PATENT DOCUMENTS

DE 203 07 633 10/2003
GB 2 255 905 11/1992

* cited by examiner

*Primary Examiner*—Alexander Grosz
(74) *Attorney, Agent, or Firm*—Dykema Gossett PLLC

(57) ABSTRACT

A volume-flexible body fillable with a fluid including two sheets preferably welded together along the peripheral edges and preferably made of synthetic material, as well as a connection piece for a line for fluid inlet or outlet, preferably gas, especially air, into or from the body, whereby the connection piece (4, 10, 12a) extends into the body (K) from the location of entry parallel to the plane defined by the peripheral edge (3) and possibly extending past the location of entry parallel to the plane defined by the peripheral edge (3) and leading through the edge and/or penetrating one of the sheets (1) and leading into the interior of the body (K).

The connection piece (4) is provided with radial openings (5) whereby the connection piece (4) extends completely through the body (K) and leads again to the outside through the edge (3) at a point opposite the place of entry to improve inflation and deflation capability and to maximize additionally the usable surface and/or to accomplish installation in the best possible way.

14 Claims, 2 Drawing Sheets

VOLUME-FLEXIBLE BODY FILLABLE WITH A FLUID ELEMENT

BACKGROUND OF THE INVENTION

1. Field of the Invention

The invention relates to a volume-flexible body fillable with a fluid including two sheets, preferably welded together along the peripheral edges and preferably made of synthetic material, as well as a connection piece for a line for fluid inlet or outlet, preferably gas, especially air, into or from the body, whereby the connection piece extends into the body from the location of entry parallel to the plane defined by the peripheral edge and possibly extending past the location of entry parallel to the plane defined by the peripheral edge and leading through the edge and/or penetrating one of the sheets and leading into the interior of the body.

2. The Prior Art

In case of contour-adjustable seats, especially vehicle seats or aircraft seats, there are often provided inflatable bodies fillable with air or another gas in the form of a cushion making conformity of the shape of the seat possible. Tireless and comfortable sitting is possible over a lengthy period, for instance in case of motor vehicle seats it allows for tireless, comfortable driving for lengthy periods, and it provides improved bracing while driving into curves with lateral support elements in place. These inflatable bodies have the most varied and sometimes the most "angled" outer contours depending on the type of deployment, attachment or installation into a vehicle seat. For example, cushions having butterfly-shaped outlines are possible as well as longitudinal or substantially round bodies. If large adjustments in height are desired, types of bodies can be used consisting of two or a plurality of elements lying on top of each other and which also can be in fluid connection to one another. For example, such bodies can also be formed by two or a plurality of elements connected at one edge by a common hinge to allow stacking on top of each other during employment as it is exemplary disclosed in DE 203 07 633 U1. A fluid connection can be formed between the individual elements by said hinge or by a segment thereof.

As disclosed in DE 203 07 633 U1 as well as by the single embodiment of U.S. Pat. No. 4,965,899 A, the supply of fluid of the fillable body occurs often by means of connection pieces positioned near the edge of the outer contour; however, the connection pieces are then positioned at the upper side or the bottom side of the body in the deflated condition and normally they are oriented essentially toward the upper side or the bottom side. At best, the connection pieces projecting from the surface of the body transform into sectional elements by means of angled pieces extending then essentially parallel to the respective surface of the body. Such connection pieces are therefore either on the side facing the user, and thus decreasing the usable surface since they should not be felt by the user, or the connection pieces are on the side facing the carrier whereby they require recesses or special re-routing of the fluid line whereby they are additionally difficult to access. Connection pieces arranged on the usable surface have the additional disadvantage that the connected fluid line must move along with the height adjustments, especially in case of bodies with a capability of large adjustment in height. In addition, this arrangement makes inflating and deflating of the body more difficult, especially if the body is very flat or possibly if the outer contour is shaped very irregular and the opening of the connection piece is covered by the opposed sheet of material.

Connection pieces for a supply line on fillable bodies, which somewhat extend into the body from the location of entry and lying parallel to the plane defined by the peripheral edges, can also be seen in GB 2 255 905 A, U.S. Pat. No. 4,965,899 A, as well as in U.S. Pat. No. 6,353,207 B1. A solution is illustrated in the latter document wherein the connection piece leads into the interior of the body through the welded edge.

It was therefore the object of the present invention to design a body of the aforementioned type in such a manner that inflating and deflating is improved and whereby the usable space is additionally maximized and/or whereby installation can be accomplished in the best possible way.

SUMMARY OF THE INVENTION

For the achievement of this object, the body of the invention is characterized in that the connection piece is provided with radial openings, extends completely through the body and leads again to the outside through the edge at a point opposite of the location of entry. The sheets are thereby kept apart in the vicinity of the extension along a great length so that one or each actual inlet or outlet opening of the extension is always kept free and good inflation or deflation can be guaranteed at all areas, even in case of bodies having complicated outer contours.

A connection in series of several bodies is possible in this embodiment if connection pieces exiting the outside of the first body are connected via a fluid line to the next body.

Otherwise, the connection piece can be sealed at one end at the outer side of the edge.

According to an advantageous embodiment of the invention, the segment of the connection piece lying inside the body forms a hinge axis whereby the sheets stacked on top of one another are folded along this hinge axis. On the other hand, mechanical reinforcement of the hinge area is thereby provided and, on the other hand, the best unrestricted inflation and deflation of the folded, stacked sections of the body is ensured.

If it is desired to prevent a fluid connection between the sections of the body and to provide inlet and outlet of fluid only through the connection piece, an inventive design is advantageously selected whereby the cavity of the body is divided into two separate sections or cells, possibly along the entire hinge axis, by means of the segment of the connection piece lying inside the body whereby the separate sections are in communication only through the radial openings in the connection piece.

According to the invention, the connection piece transforms at the inner side of the sheets into an air diffuser with radial openings essentially branching out in a radial manner inside the body to further improve unrestricted inflation and deflation of the body. On the one hand, the sheets are kept at a distance apart by the air diffuser in the region thereof so that its radial openings are kept free. On the other hand, the fluid supply or discharge is distributed across a large area to make possible a rapid and quiet inflation and deflation.

These advantages can be enhanced if the connection piece is transformed on the inner side of the edge into two essentially radial air diffusers branching off in opposite directions within the interior of the body.

According to an additional characteristic of the invention, the mechanical stability of bodies consisting of stacked and folded sections can be increased also in this case if the air diffuser forms a hinge axis and the stacked sheets are folded along this hinge axis.

Fluid exchange between the individual sections can be prevented even in an embodiment of this type if the cavity of the body is divided by the air diffuser into two separate sections, possibly along the entire hinge axis, whereby the separate sections are in communication only by the radial openings in the connection piece.

An advantageous embodiment including all of the above-described variations of design has the characteristics that narrow radial elements project from the segment of the connection piece or the air diffuser lying inside the body whereby the radial elements preferably extend between said radial opening and extend between the sheets lying on top on one another. The sheets are kept at a distance apart by these radial elements across wide areas and away from the connection piece or the air diffuser, which ensures free inflowing or outflowing of fluid through the connection piece or the air diffuser from a large area of the body.

The embodiments of fillable bodies according to the invention and details thereof are described in more detail in the following description with reference to the accompanying drawings.

BRIEF DESCRIPTION OF THE DRAWINGS

FIG. 2b shows one possibility of manufacturing the hinge area of FIG. 2a;

DETAILED DESCRIPTION OF THE PREFERRED EMBODIMENTS

Figure 1:
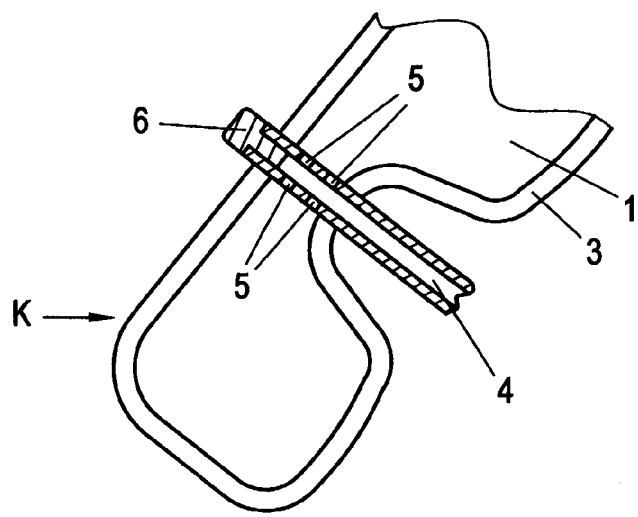
FIG. 1 shows an air-inflatable cushion for installation into motor vehicle seats.

A body K fillable with a fluid and being therefore flexible in its volume consists of two sheets 1, 2 facing each other whereby the sheets are sealed together along their outer contour by a welded bond 3 (only the top sheet 1 is visible in FIG. 1). The sheets 1, 2 can also be attached to one another through other bonding methods, i.e., through adhesion. The actual welded bond 3 is broken at two opposed points and a connection piece 4 is inserted between the two sheets 1, 2 parallel to the plane of the flat surface of the body K or parallel to the plane of the outer contour of the body to facilitate the supply and discharge of fluid whereby the connection piece 4 protrudes again from the body K on the opposite side of the point of entry.

The connection piece 4 is provided with radial openings 5 through which the fluid can flow into the body K and flow out from there across a greater length of the connecting piece 4. Lower flow velocity is made possible thereby for the fluid in spite of rapid inflation or deflation, which also contributes to less operational noise. The end of the connection piece 4, which lies outside the body K opposite the fluid source, is sealed by a plug 6 that is possibly detachably inserted. The connection of the fluid line to an additional user would possibly be in place of the plug 6, i.e., an additional inflatable body K.

The sections of the body K lying on the side of the connecting piece 4 can also be folded on top of one another to form a dual bladder whereby the connecting piece 4 forms then a mechanically highly stable hinge area of this dual bladder. An exemplary embodiment of such a hinge area is illustrated in cross section in FIG. 2a. The two sheets 1, 2 lie thereby closely against the connection piece 4, which determines the angle or radius by its cross-sectional shape by which the two sections of the body K are connected to each other. The connection piece 4 can be made thereby of a solid material so that no deforming has to be feared while attaching the sheets 1, 2.

Figure 2A:
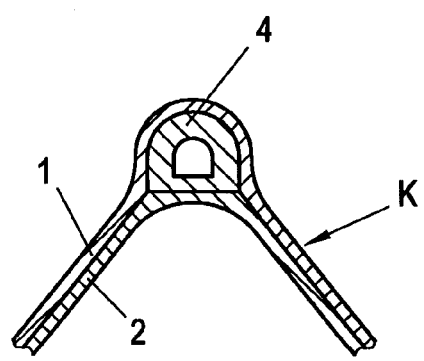
FIG. 2a is a detailed view in cross section of the hinge area of a cushion consisting of sections folded on top of one another.
Figure 2B:
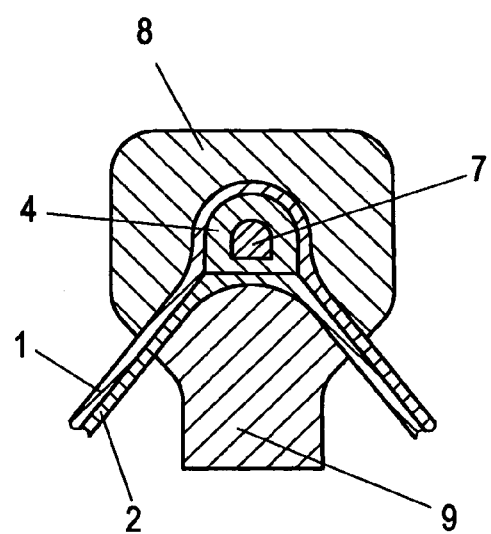

The manufacturing method shown schematically in FIG. 2b can be selectively used, for example, for connection pieces 4 made of soft material. Provided is a core 7 made of a hard material that can be dissolved, melted or the core can be made of material that can be removed in some other way, while the sheets 1, 2 are pressed onto the rigidly held connection piece 4 and wrapped closely about the connection piece 4 by means of a top tool 8 and a bottom tool 9. So-called rod welding can also be proposed as a manufacturing method. A rod, i.e., a wire or pin, with a cross section corresponding to the inner cross section of the connection piece 4 is inserted into the connection piece 4 so that it is not deformed during the welding process—which means, it counters the corresponding amount of resistance of the two welding tools used for circumferential welding of the sheets 1,2. The rod is then pulled again from the connection piece 4 after completion of the welding process.

If a configuration is thereby achieved as shown in FIG. 2a and FIG. 2b wherein the sheets 1, 2 completely envelop the connection piece 4, then a direct fluid connection is prevented between the two sections of the body K and fluid can only flow into each of the sections through the openings 5 in the connection piece 4 or the fluid can flow out from these sections through the openings 5.

Figure 3:
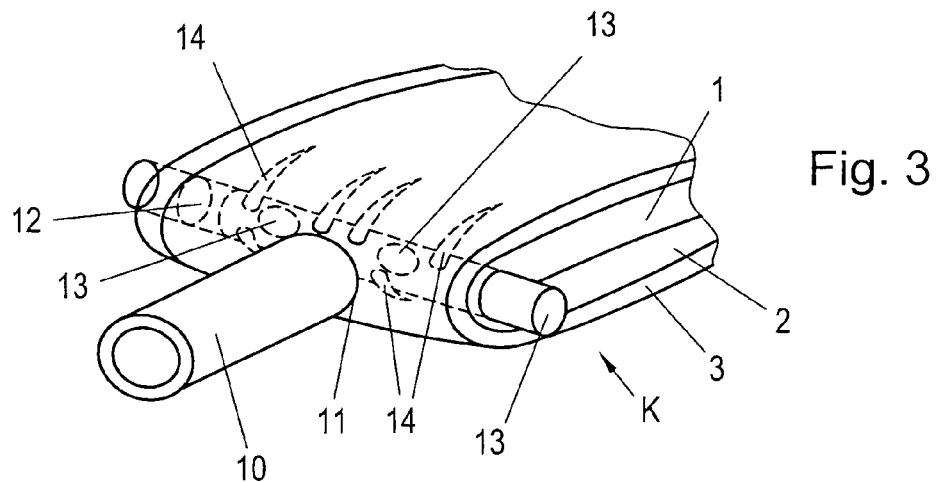
FIG. 3 is a perspective view of the hinge area for a cushion consisting of sections folded on top of one another; however, having another design for the connection piece and the air diffuser.

Another embodiment example is illustrated in FIG. 3, which shows a connection piece 10 normally oriented toward the sheets 1, 2 and which penetrates one of the sheets 1 and leads through an opening 11 into the cavity of the body K. Two radial branches of an air diffuser 12 projecting in opposite direction from the connection piece 4 branch off in the cavity of the body K. The air diffuser 12 extends parallel to the plane of the sheet 1, 2 and/or of the weld contour 3 inside the body K and said diffuser 12 facilitates through its radial openings 13 the filling or emptying of the body K across a large area with a low flow velocity at the individual openings 13 having thereby a low operational noise level.

The sheets must be kept at a distance apart in the hinge area, at least along a portion of the length of the air diffuser 12, and they must be kept at a specific distance away from the air diffuser 12 to ensure an unrestricted fluid flow through the openings 13 in spite of the small radius curvature in the hinge area, around the air diffuser 12, and between the sheets 1, 2 being pressed against one another and pressed against the air diffuser 12. Longitudinal elements 14 extending radially from the air diffuser 12 are provided for this purpose whereby the elements 14 are arranged between the openings 13 preventing thereby contact of the sheets 1, 2 to one another for the most part. Of course, such an arrangement is also possible for the embodiment of FIGS. 1, 2a and 2b so that the radial openings of the connection piece 10 are not restricted in the best possible way.

Figure 4:
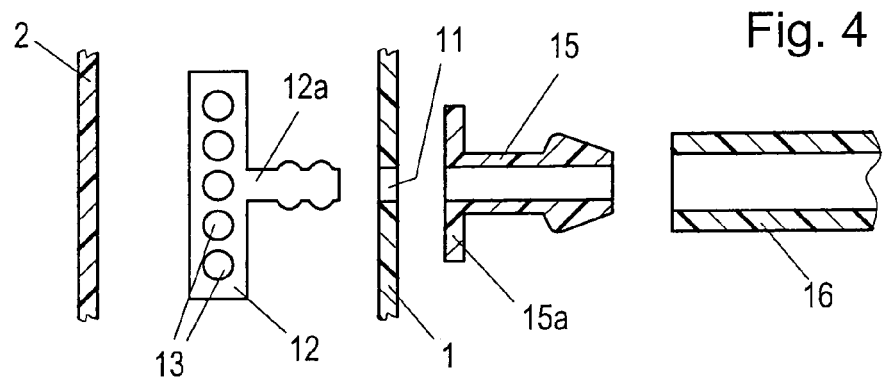
FIG. 4 shows an exploded view of the individual parts of the hinge area of the cushion in FIG. 3.

FIG. 4 shows a possible design of the body K according to FIG. 3 in cross section and in an exploded view. The air diffuser 12 in the shape of a "T" is inserted between the bottom sheet 2 and the top sheet 1. Outside of the body K, which means above the top sheet 1, a hose connection piece 15 is placed on the connection piece 12a of the air diffuser protruding through the opening 11 in the top sheet 1 whereby the hose connection piece 12a can be additionally welded, adhesively bonded or attached with another method known in the art by means of a projecting base piece 15a. The actual fluid line, i.e., an air hose 16, can then be pushed over the hose connection piece 15.

Figure 5A:
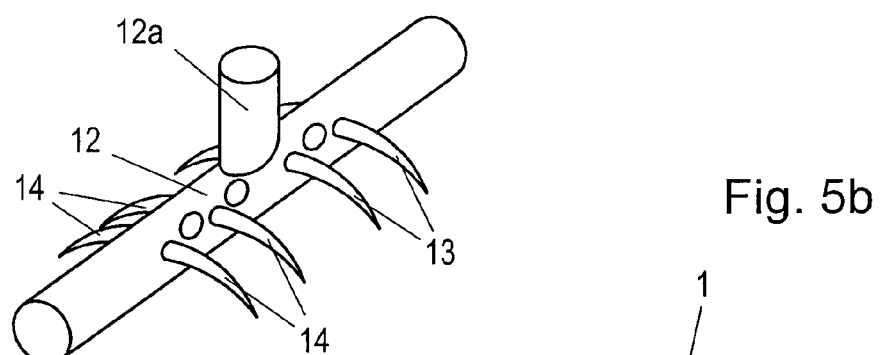
FIG. 5a is a perspective view of a connection piece together with an air diffuser and radial elements serving as spacers between the sheets.
Figure 5B:
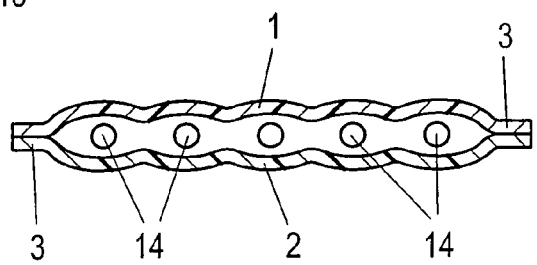
FIG. 5b is a cross section through an inflatable body in the region of the radial elements.

A perspective view of only the T-shaped air diffuser 12 of FIG. 3 is illustrated in FIG. 5a. The connection piece 12a can be seen therein from which extends radially and in opposite direction the two branches of the air diffuser 12 with its radial inlet and outlet openings 13 for the air flow. The longitudinal elements 14 between the openings 13 can also be seen whereby these elements 14 also extend radially from the two branches of the air diffuser 12 in the direction of the cavity of both sections of the body K and the elements 14 prevent direct contact of the sheets as it can be seen in FIG. 5b in cross section. This cross section is at a distance away from the air diffuser 12 and it shows how the radial elements 14 keep the sheets 1, 2 apart in the region between the marginal welding contours 3 under the formation of flow channels for the fluid.

I claim:

1. A volume-flexible body fillable with a fluid comprising two sheets connected together along the peripheral edges and a connection piece for a line for fluid inlet or outlet into or from the body, whereby said connection piece extends into the body from the location of entry parallel to the plane defined by the peripheral edge, wherein the connection piece is provided with radial openings, extends completely through the body and leads again to the outside through the edge at a point opposite a location of entry.

2. A body according to claim 1, wherein the connection piece is sealed at one end at the outer side of the edge.

3. A body according to claim 2, wherein a segment of the connection piece lying inside the body forms a hinge axis whereby the sheets stacked on top of one another are folded along this hinge axis.

4. A body according to claim 3, wherein the cavity of the body is divided into two separate sections or cells by means of the segment of the connection piece lying inside the body whereby said separate sections are in communication only through the radial openings in the connection piece.

5. A body according to claim 4, wherein the connection piece functions as an air diffuser between the sheets with air emitted in a radial manner inside the body.

6. A body according to claim 5, wherein the connection piece functions as two essentially radial air diffusers branching off in opposite directions within the interior of the body.

7. A body according to claim 6, wherein the air diffuser forms a hinge axis and the stacked sheets are folded along this hinge axis.

8. A body according to claim 7, wherein the cavity of the body is divided by the air diffuser into two separate sections, whereby said separate sections are in communication only by the radial openings in said air diffuser.

9. A body according to claim 8, wherein narrow radial elements project from the segment of the connection piece or the air diffuser lying inside the body and whereby the radial elements preferably extend into the interior of the body between said opening and between the sheets lying on top on one another.

10. A body according to claim 1, wherein said two sheets are welded together.

11. A body according to claim 1, wherein said two sheets are made of synthetic material.

12. A body according to claim 1, whereby said connection piece extends past said location of entry parallel to the place defined by the peripheral edge.

13. A body according to claim 1, wherein said connection piece extends through a peripheral edge.

14. A body according to claim 1, wherein said connection piece extends through a sheet.

* * * * *